US011865736B2

(12) United States Patent
Fu et al.

(10) Patent No.: US 11,865,736 B2
(45) Date of Patent: Jan. 9, 2024

(54) PERFORATING DEVICE FOR THERMOPLASTIC PLATES

(71) Applicant: Civil Aviation Flight University of China, Deyang (CN)

(72) Inventors: Weigang Fu, Deyang (CN); Huanjie Xiong, Deyang (CN); Yaoming Fu, Deyang (CN)

(73) Assignee: Civil Aviation Flight University of China, Deyang (CN)

( * ) Notice: Subject to any disclaimer, the term of this patent is extended or adjusted under 35 U.S.C. 154(b) by 0 days.

(21) Appl. No.: 18/122,738

(22) Filed: Mar. 17, 2023

(65) Prior Publication Data

US 2023/0356425 A1 Nov. 9, 2023

(30) Foreign Application Priority Data

May 7, 2022 (CN) ........................ 202210491775.8

(51) Int. Cl.
*B26F 1/24* (2006.01)
*B26D 7/26* (2006.01)
*B26D 7/10* (2006.01)
*B26D 7/02* (2006.01)

(52) U.S. Cl.
CPC ................ *B26F 1/24* (2013.01); *B26D 7/025* (2013.01); *B26D 7/10* (2013.01); *B26D 7/2614* (2013.01)

(58) Field of Classification Search
CPC .. B26F 1/24; B26D 7/025; B26D 7/10; B26D 7/2614
See application file for complete search history.

(56) References Cited

U.S. PATENT DOCUMENTS

| | | | | |
|---|---|---|---|---|
| 3,719,113 A * | 3/1973 | Gerber | B26D 7/20 83/56 |
| 2011/0162495 A1* | 7/2011 | Sugiyama | B26F 1/24 83/13 |
| 2021/0260712 A1* | 8/2021 | Song | B26D 7/086 |

FOREIGN PATENT DOCUMENTS

| | | |
|---|---|---|
| CN | 202387833 U | 8/2012 |
| CN | 104960031 A | 10/2015 |
| CN | 204894087 U | 12/2015 |
| CN | 207724675 U | 8/2018 |
| CN | 109049120 A | 12/2018 |
| CN | 110154141 A * | 8/2019 |
| CN | 209699268 U | 11/2019 |
| CN | 111300541 A | 6/2020 |

(Continued)

*Primary Examiner* — Jonathan G Riley

(57) ABSTRACT

The invention relates to a perforating device for thermoplastic plates, which relates to the technical field of a plate processing device. The device includes an electromagnetic chuck, one side of the electromagnetic chuck is connected with the driving member, the other side of the electromagnetic chuck is connected with a mounting plate and a spike. When the electromagnetic chuck is powered on, the spike is attracted below the mounting plate by an electromagnetic force generated by the electromagnetic chuck. A clamper is arranged below the mounting plate, the thermoplastic plate is fixed by the damper, and a heating system is also provided to heat the thermoplastic plate. As the electromagnetic chuck is powered on or off, the spike can be attracted in or separated from the mounting plate, respectively. Therefore, the perforating device can make a new plate be pierced during the cooling and curing process of the perforated plate.

8 Claims, 6 Drawing Sheets

(56) References Cited

FOREIGN PATENT DOCUMENTS

| | | | | | |
|---|---|---|---|---|---|
| CN | 111390986 | A | * | 7/2020 | |
| CN | 112248111 | A | | 1/2021 | |
| CN | 213471447 | U | | 6/2021 | |
| EP | 0893214 | A2 | | 1/1999 | |
| KR | 2017117767 | A | * | 10/2017 | ................ B26F 1/02 |
| WO | WO-2019203074 | A1 | * | 10/2019 | ............. A61F 13/15 |

* cited by examiner

PERFORATING DEVICE FOR THERMOPLASTIC PLATES

FIELD OF THE INVENTION

The present invention relates to the field of the thermoplastic plate processing equipment, and specifically to a perforating device for thermoplastic plates.

BACKGROUND OF THE INVENTION

For the thermoplastic plate, two methods are usually used for perforating, one is using a drill for perforating at room temperature, the other is first heating the area to be perforated in the plate and then making a spike pierce the heated area of plates. For the first method, it is easy to cause structural changes in the thermoplastic plate. For example, many thermoplastic plates are filled with fillers to improve their performance, such as reinforced fibers and others. If the plate is perforated directly, the structure of these fillers will be easily damaged during the perforation process, resulting in the performance degradation of thermoplastic plates. For the second method, it does not destroy the fillers' structure of plates as the first method. Therefore, the second method of perforation after heating is more superior, especially for some fields that require high performance of thermoplastic plates, such as the aerospace, where the second method of perforation is a preferable choice.

When the second method is used for perforating, the area to be perforated in the plate is usually heated to a certain temperature, and the spike assembled in the perforating device is used to pierce the heated area of plates. The spike is required to remain in the plate for some time, the heated area of plates with spike is curing by natural cooling at room temperature and atmospheric pressure, which can degrade the performance of the plates. A better way to solve the problem is to put the heated area of plates with spike into the autoclave for curing as quickly as possible, after the heated area of plates has been pierced by the spike. The existing perforating device for thermoplastic plates can't make a new plate be pierced during the cooling and curing process of the perforated plate, which greatly reduces the working efficiency of the perforating device, and it is not applicable for the thermoplastic plate with high performance requirements or high working efficiency.

SUMMARY OF THE INVENTION

In view of the above, in order to solve at least one of the above problems, the present invention aims to provide a thermoplastic plate perforating device. After the thermoplastic plate being pierced by the spike, the spike attached to the heated area of plates can be detached from the perforating device, so that the perforating device can install a new spike for a new perforation, which is more efficient; moreover, the heated area of plates with spike can be curing in the autoclave, which can improve the performance of the perforated plates during the perforating process.

In order to achieve the above mentioned purpose, the present invention provides the following technical solutions:

The perforating device for thermoplastic plates provided by the present invention includes an electromagnetic chuck, one side of the electromagnetic chuck connected with a driving member, the other side of the electromagnetic chuck connected with a mounting plate and a set of spikes assembled with the mounting plate so that the mounting plate is arranged between the spike and the electromagnetic chuck, and the electromagnetic chuck secures the mounting plate on which the spike is located, a head of the spike arranged on the spike, and wherein the electromagnetic chuck provides an electromagnetic force so that electromagnetic force secures the mounting plate on which the head of the spike is located, a clamper arranged below the mounting plate and configured to clamp a thermoplastic plate therein, and a heating system provided below the mounting plate to heat the thermoplastic plate; and wherein two sliding rails are arranged below the mounting plate, and the damper is arranged between the two sliding rails and configured to move along the two sliding rails; and wherein the heating system is arranged on the two sliding rails and comprises two heating parts arranged opposite to each other, each of the two heating parts comprising a heating wire and a reflective heat focusing hood, the reflective heat focusing hoods configured to reflect heat generated by the heating wires, one of the two heating parts arranged above the two sliding rails, the other of the two heating parts arranged below the two sliding rails.

Optionally or preferably, wherein one side of the mounting plate facing away from the electromagnetic chuck is provided with a groove, a shape and a size of the groove corresponding to a shape and a size of the head of the spike, so that when the head of spike is arranged in the groove, the spike cannot rotate or move.

Optionally or preferably, a horizontal circular ring is arranged at an upper part of the head of the spike, a lower surface of the horizontal circular ring is an annular plane, and an area of the horizontal circular ring is larger than an area to be perforated in the plate.

Optionally or preferably, two splints are arranged on the upper and lower part of the damper, respectively.

Optionally or preferably, the damper also includes a handle.

Optionally or preferably, wherein each of the reflective heat focusing hoods includes a top cover, a middle part of the top cover is a circular surface, and an upper ring is arranged below the circular surface and hinged with some inner reflective plates and outer reflective plates, the inner reflective plate and the outer reflective plate are arranged alternately around the upper ring, there is an overlap between the inner reflective plates and the adjacent outer reflective plates, and the inner reflective plates are arranged under the outer reflective plates; the bottom part of each inner reflective plate is fixed with a secondary steel wire rope, all the secondary steel wire ropes gather in the middle of the top cover and then form the main steel wire rope. The main steel wire rope is attached to a capstan; and wherein a lower ring is arranged below the upper ring, the lower ring and the upper ring keep static with respect to the top cover, the diameter of the lower ring is larger than the upper ring, at least one return spring is arranged on each outer reflective plate, one end of the return spring is fixed with the outer reflective plate, the other end of the return spring is fixed with the lower ring.

Optionally or preferably, the heating system also comprises a distance adjustment member, the distance adjustment member includes two hexagonal frames respectively arranged on the two sliding rails in the same way, each of the two hexagonal frame includes two parallel edges respectively parallel to the two sliding rails, and four side edges formed between the two parallel edges. All the two parallel edges and the four side edges of each of the two hexagonal frames hinged, and a sliding hinged point that is formed between two adjacent edges of the four side edges slidably arranged on a corresponding sliding rail of the two sliding rails, and a lock catch arranged on the corresponding sliding rail of the two sliding rails. Each of the two hexagonal frame includes two limit sliding rails perpendicular to the two sliding rails, a limit sliding chute arranged on two opposite ends of each of the two limit sliding rails, each of the four side edges is hinged with one of the two adjacently parallel edges by a hinged point, the hinged points between the parallel edges and the side edge are all located in the limit sliding chute, the two same hinged points in the two hexagonal frames are connected by a connecting rod, and the connecting rod is perpendicular to the plane of hexagon in the hexagonal frames. One heating part is fixed on the upper parallel edges of the two hexagonal frames, the other heating part is fixed on the lower parallel edges of the two hexagonal frames.

Optionally or preferably, the driving member comprises an air supply connector, one side of the air supply connector is connected with a cylinder, a piston received in the cylinder and connected with one end of a piston rod, the other end of the piston rod is connected with the electromagnetic chuck.

Based on the above mentioned technical solution, at least the following technical effects are achieved by the present invention through the above technical solutions:

According to the perforating device for thermoplastic plates provided by this disclosure, the electromagnetic chuck, the mounting plate and the spike are arranged on the perforating device, the electromagnetic chuck can attract the spike in the mounting plate or make the spike be free from the mounting plate, therefore, the working efficiency of the perforating device can be improved.

In addition, in the perforating process of some high performance of the thermoplastic plate, the spike can be separated from the perforating device and kept in the heated area of plates for further curing, so that the perforating device can be used for another new perforation of a new thermoplastic plate.

Figure 1:
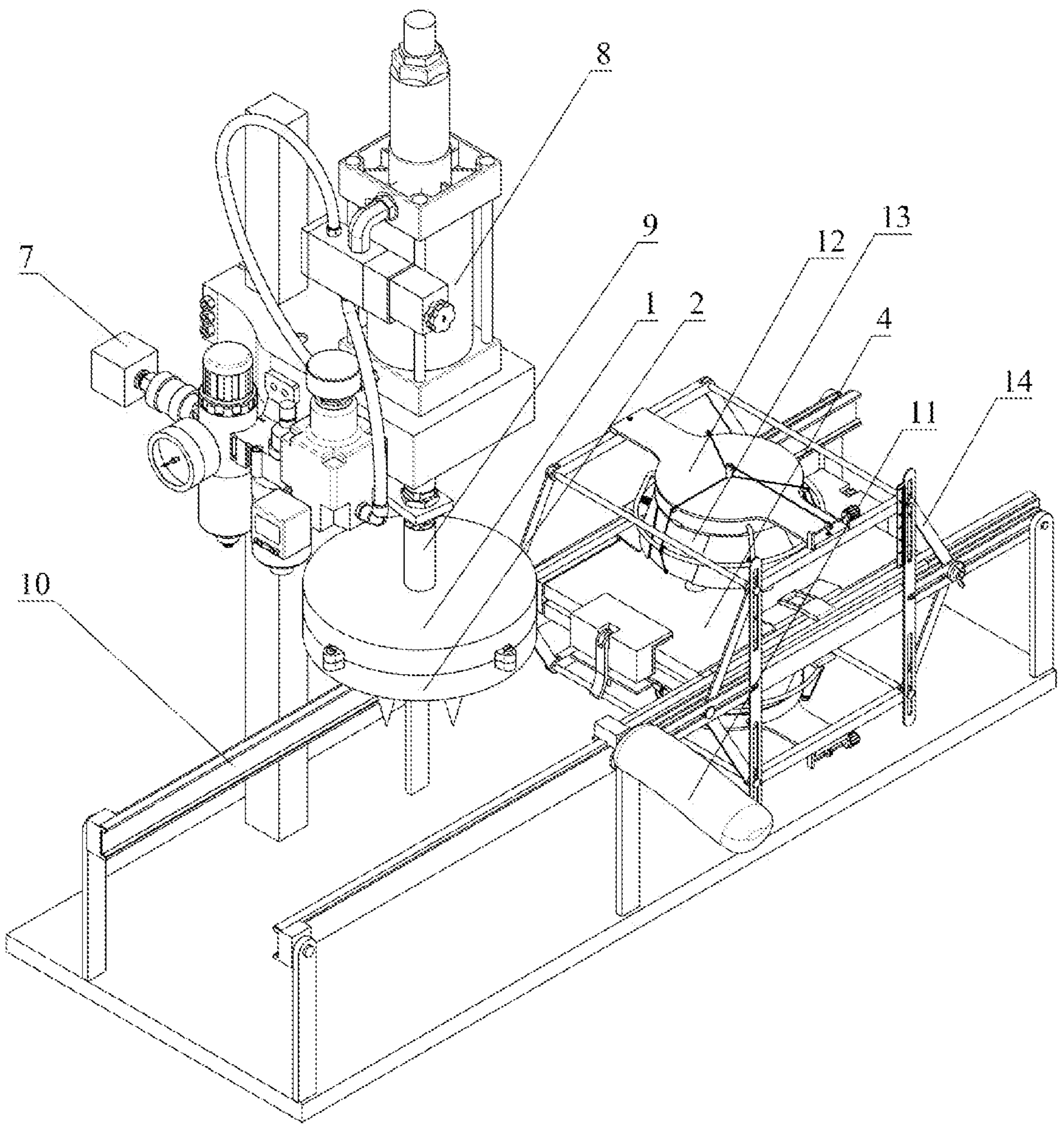
FIG. 1 is a schematic diagram of the perforating device for thermoplastic plates of the present invention.

The element labels according to the exemplary embodiment of the present disclosure shown as below: electromagnetic chuck 1, mounting plate 2, spike 3, head of spike 301, horizontal circular ring 302, clamper 4, splint 401, air supply connector 5, groove 6, flow regulating valve 7, cylinder 8, piston rod 9, sliding rail 10, handle 11, heating system 12, heating part 13, heating wire 1301, reflective heat focusing hood 1302, inner reflective plate 130201, outer reflective plate 130202, top cover 130203, upper ring 1303, lower ring 1304, secondary steel wire rope 1305, main steel wire rope 1306, capstan 1307, return spring 1308, distance adjustment member 14, hexagonal mechanism 1401, parallel edge 1402, side edge 1403, sliding hinged point 1404, hinged point 1405, lock catch 1406, limit sliding rail 1407, limit sliding chute 1408, connecting rod 1409, thermoplastic plate 15.

DETAILED DESCRIPTION OF PREFERRED EMBODIMENTS

In order to make the objectives, technical solutions and advantages of the present disclosure more clearer, the technical solutions of the present disclosure will be described in detail below. Obviously, the described embodiments are only a part of the embodiments of the present invention, but not all of the embodiments. All other embodiments obtained by ordinary technician in the art based on the embodiments of the present disclosure without creative efforts shall fall within the protection scope of the present disclosure.

Embodiment 1

Figure 2:
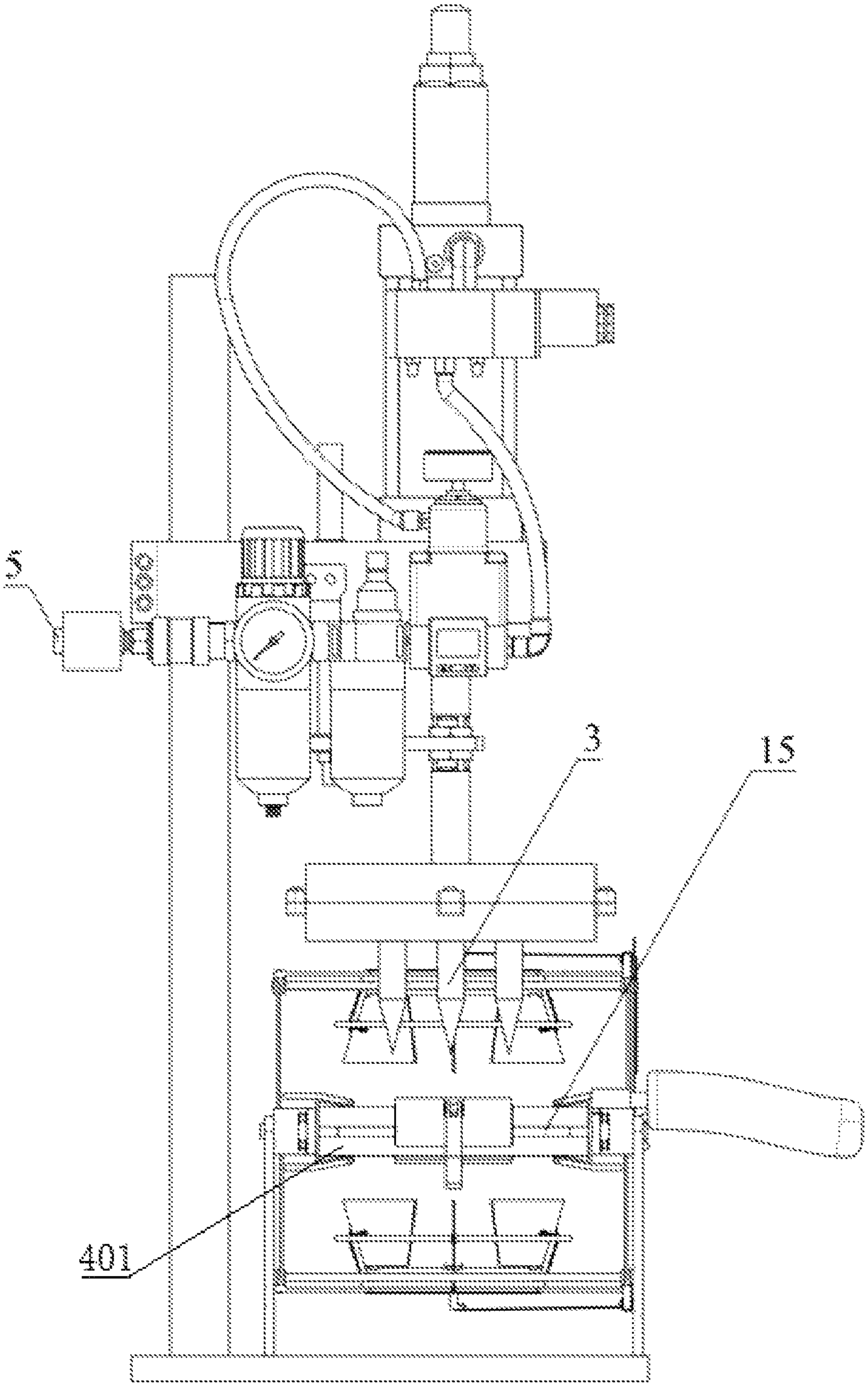
FIG. 2 is a left view of the perforating device for thermoplastic plates of the present invention.
Figure 3:
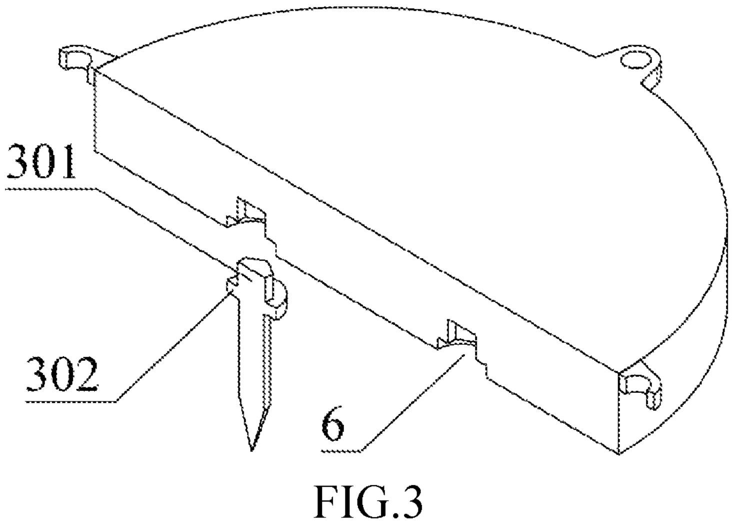
FIG. 3 is a sectional view of the spike and the mounting plate of the present invention.
Figure 4:
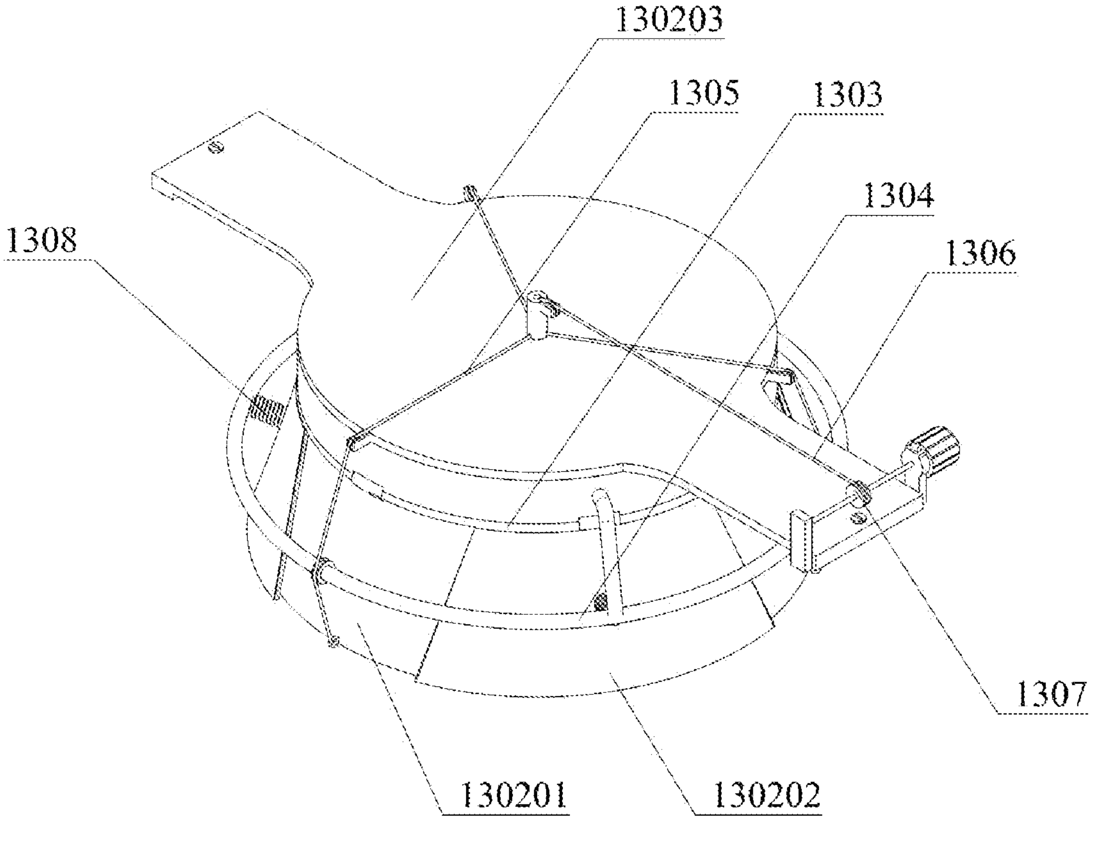
FIG. 4 is a schematic diagram of the heating part of the present invention.
Figure 5:
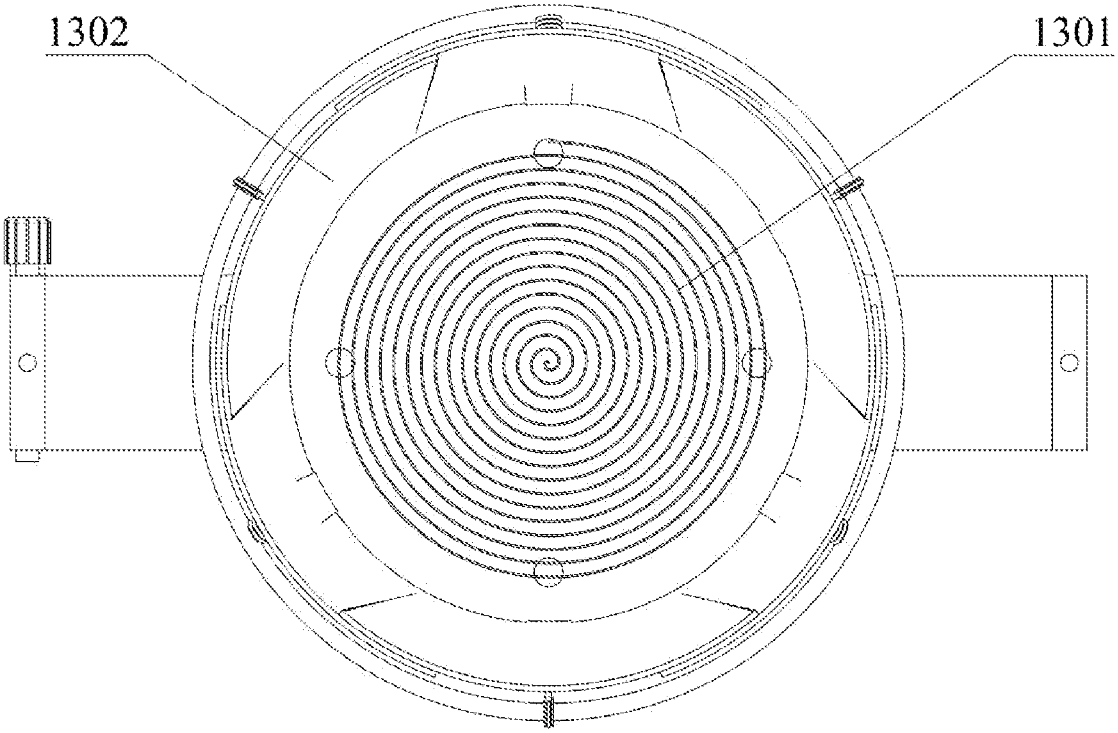
FIG. 5 is a sectional view of the heating part of the present invention.
Figure 6:
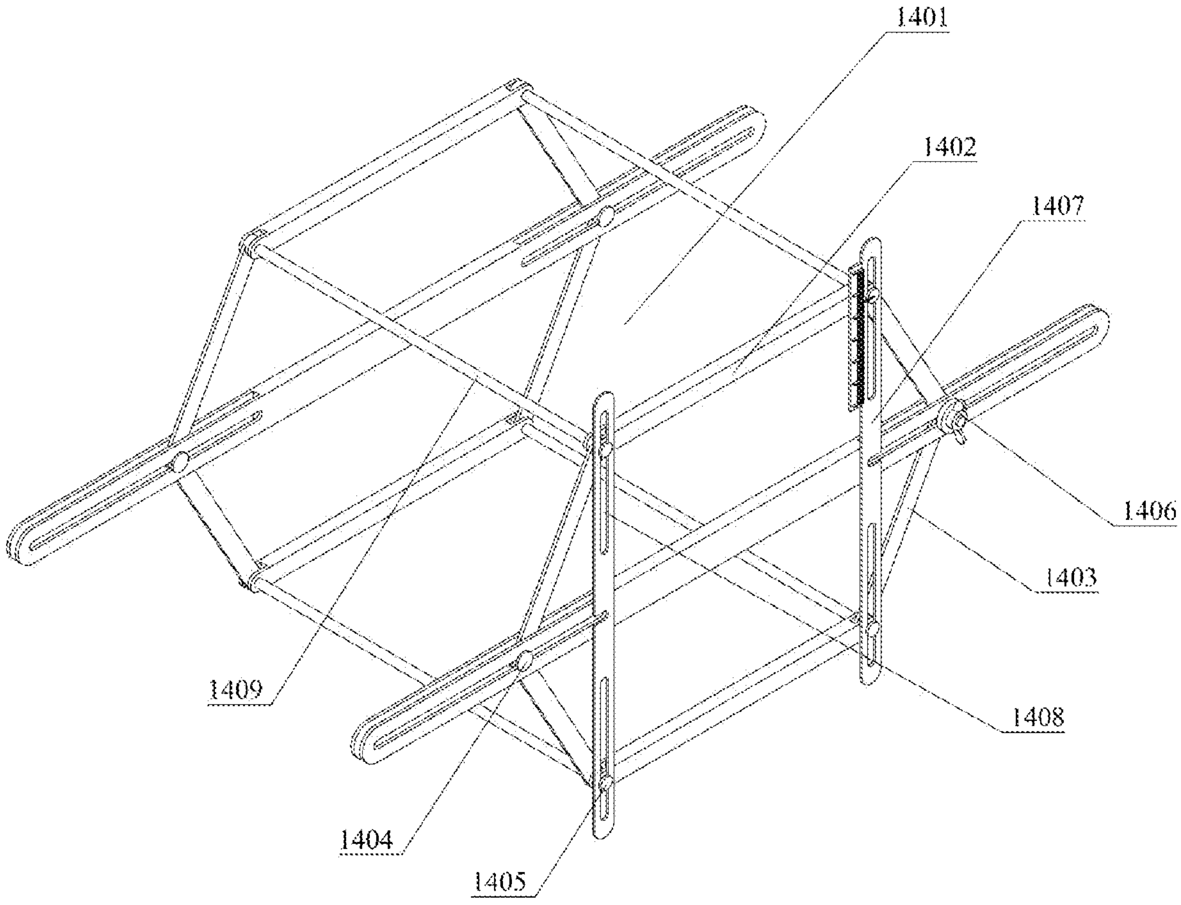
FIG. 6 is a schematic diagram of the distance adjustment member of the present invention.

As shown in FIGS. 1-3

The embodiment provides a perforating device for thermoplastic plates, the perforating device comprises an electromagnetic chuck 1, one side of the electromagnetic chuck 1 is connected with a driving member, the other side of the electromagnetic chuck 1 is connected with a mounting plate 2 and a set of spikes 3, the spike 3 is attracted by an electromagnetic force that is generated by the electromagnetic chuck 1, and located on a lower side of the mounting plate 2 when the electromagnetic chuck 1 is powered on, a clamper 4 is provided below the mounting plate 2, a thermoplastic plate 15 is clamped in the damper 4, a heating system 12 is also provided below the mounting plate 2 to heat the thermoplastic plate 15.

Specifically, the electromagnetic chuck 1 has an internal electromagnetic coil, which can generate an upward electromagnetic force to attract the ferromagnetic materials when the electromagnetic chuck 1 is powered on. For the electromagnetic chuck 1, its structure has no special requirements, as long as the structure adopted by the electromagnetic chuck 1 can generate electromagnetic force in the case of power on, and the electromagnetic force disappears in the case of power off. However, in order to facilitate the operation of perforating device, the upper and lower surfaces of the electromagnetic chuck 1 are preferable to be the flat planes.

The mounting plate 2 arranged below the electromagnetic chuck 1 is made of the ferromagnetic material, such as the iron, the mounting plate 2 can be magnetized as the electromagnetic chuck 1 is powered on, and the spike 3 can be attracted and located in the mounting plate 2; hence, as is known to the technician in the art, the spike 3 should also be made of the ferromagnetic material, because the spike 3 is a detachable setting in this embodiment, some more spikes 3 are required, other single spike 3 with different size and shape can be used for a single opening in the thermoplastic plates 15, multiple spikes 3 with different size and shape can be combined for a set of openings in the thermoplastic plates 15.

In some case, in order to further attract the spike 3 tightly on the mounting plate 2, at least one groove 6 is provided at the lower side of the mounting plate 2, a shape and a size of the grooves 6 corresponding to a shape and a size of the head of spike 301, during the installation process of the spike 3, the electromagnetic chuck 1 is powered on first, and then the head of the spike 301 is placed in the groove 6, and the head of the spike 301 can be tightly arranged at the lower side of the mounting plate 2 by the electromagnetic force and the groove 6, which can effectively avoid the spike 3 detaching from the mounting plate 2 during the piercing process. In addition, for the groove 6 and the head of the spike 301, their shape preferably meets the following requirements: the spike 3 cannot rotate or move after the head of the spike 301 is placed in the groove 6. If the head of the spike 301 can rotate or move freely in the groove 6, the position of the spike 3 may change during the piercing process. In this case, even a small position changing of the spike 3 may change the position of the area to be perforated. The above purpose can be achieved by setting the groove 6 to be the shape of pyramid, prism and others. Obviously, all other shapes of the groove 6, which can achieve the above purpose, are within the scope of protection of the invention.

After the piercing of the spike 3, the spike 3 should be separated from the mounting plate 2 so that the spike 3 can be kept in a heated area to be perforated for further curing. As the axis of the spike 3 is not perpendicular to the upper surface of the heated area during the curing process, the quality of the opening in the thermoplastic plate 15 will be influenced and bad. In order to avoid the above bad quality, a horizontal circular ring 302 is arranged in the upper part of the head of the spike 301 in some embodiments, the lower surface of the horizontal circular ring 302 is an annular plane, and the size of the horizontal circular ring 302 is larger than the area to be perforated in the plates. The horizontal circular ring 302 makes the axis of the spike 3 be perpendicular to the upper surface of the heated area after the separating of the spike 3 from the mounting plate 2, which will be beneficial for the curing quality of the opening in the thermoplastic plate 15. In some cases, the horizontal circular ring 302 can be integrated with the head of the spike 301 to make the spike 3 be easy to manufacture and carry.

The driving member makes the electromagnetic chuck 1, the mounting plate 2 and the spike 3 move up and down. In the art, the driving member can be driven by different types, such as the electric type and pneumatic type. In this embodiment, the pneumatic type is chosen to drive the driving member, the pneumatic type comprises the air supply connector 5, one side of the air supply connector 5 is the air supply, the other side of the air supply connector 5 is the flow regulating valve 7 and cylinder 8, successively, a piston is arranged in the cylinder 8, one end of the piston rod 9 is arranged on the lower side of the piston, the other end of the piston rod 9 is arranged on the electromagnetic chuck 1, the driving member of the pneumatic type belongs to the available technology, it has been widely used in many devices in the art, and its detailed structure is not described here.

In order to prevent the position of the thermoplastic plate 15 from changing in the process of perforating, a clamper 4 is arranged to fix the thermoplastic plate 15. In the art, there are many types of the damper 4 to meet the requirements in this embodiment. For example, this embodiment discloses the damper 4, which includes two splints 401, a middle of each splint 401 are provided with at least one opening. During the perforation process, the area to be perforated in the thermoplastic plate 15 will be placed below or above the openings of the splint 401, the heating system 12 can transfer heat to the area to be perforated through the openings of the splint 401, and the spike 3 pierces the heated area to be perforated through the openings of the splint 401 too.

For the splint 401, in theory, the splint made of rigid plates can be well used in this embodiment; however, in practice, for some thermoplastic plates 15 filled with reinforced fillers, such as the fiber reinforced thermoplastic laminate, the inventors find that the fibers in the heated area to be perforated will be pushed around the spike 3 during the piercing process, some fibers around the spike 3 will not be broken after the piercing so long as the areas around the spike 3 can be heated in advance, which can be achieved by the splint 401 made by the material with a good thermal conductivity, such as the copper and other materials.

During the perforating process, the thermoplastic plates 15 are required to be heated, a heating system 12 is arranged to heat the thermoplastic plates 15. In the art, the heating system 12 in this invention can be achieved by different types.

The function of the perforating device can be realized by using the above structure, but in some embodiments, as shown in FIG. 1, FIG. 4, FIG. 5 and FIG. 6, in order to move the damper 4 conveniently and quickly, there are two sliding rails 10 arranged below the mounting plate 2, the damper 4 is arranged between the two sliding rails 10, and the damper 4 can move along the sliding rails 10. In addition, when the damper 4 is arranged between the two sliding rails 10, a handle 11 is arranged on the damper 4 to make the damper 4 move conveniently.

For the heating system 12, there are a lot of heating systems 12 at present, but for the thermoplastic plate 15, it will make some unnecessary areas be heated if the area to be heated is too wide by the heating system 12. As is known to the technician in the art, the thermoplastic plate 15 will deform after heating, wide areas to be heated will cause the change of structural performance of the thermoplastic plate 15. Hence, the common heating system 12 is not suitable for some fields that require high performance of thermoplastic plates, and a heating system 12 is proposed in this embodiment.

The heating system 12 is arranged on the two sliding rails 10, and the two sliding rails 10 support the heating system 12. The heating system 12 includes two heating parts 13 and a distance adjustment member 14. The heating part 13 is used to heat and soften an area to be perforated in the thermoplastic plate 15, and the distance adjustment member 14 is used to adjust the distance between the heating part 13 and the thermoplastic plate 15.

For the two heating parts 13, they are symmetrically arranged above and below the two sliding rails 10, and they are used to heat the upper and lower side of the area to be perforated in the thermoplastic plate 15, respectively, which leads to a fast and uniform heating on the area to be perforated by the heating parts 13. The two heating parts 13 are identical to each other.

The heating part 13 includes a heating wire 1301 and a reflective heat focusing hood 1302. The heating wire 1301 can be made of common electric heating wire or carbon fiber heating wire with higher heating efficiency, and the type of heating wire is not specified.

The reflective heat focusing hood 1302 includes a top cover 130203, the middle part of the top cover 130203 is a circular surface, and an upper ring 1303 is arranged below the circular surface, the upper ring 1303 is hinged with some inner reflective plates 130201 and outer reflective plates 130202, the inner reflective plate 130201 and the outer reflective plate 130202 are arranged alternately around the upper ring 1303, there is an overlap between the inner reflective plates 130201 and the adjacent outer reflective plates 130202, and the inner reflective plates 130201 are arranged under the outer reflective plates 130202. The outer reflective plates 130202 rotate by pivoting on the upper ring 1303 to a higher position as the bottom part of each inner reflective plate 130201 rotates by pivoting on the upper ring 1303 to a higher position, the heating wire 1301 is arranged in the space surrounded by the inner reflective plate 130201, the outer reflective plate 130202 and the top cover 130203. And, a reflective coating is coated on the inner surface of the inner reflector plate 130201, the outer reflector plate 130202 and the top cover plate 130203, which can reflect and focus the heat generated by the heating wire 1301.

The bottom part of each inner reflective plate 130201 is fixed with a secondary steel wire rope 1305, all the secondary steel wire ropes 1305 gather in the middle of the top cover 130203 and then form the main steel wire rope 1306. The main steel wire rope 1306 is attached to a capstan 1307. A lower ring 1304 is arranged below the upper ring 1303, the lower ring 1304 and the upper ring 1303 keep static with respect to the top cover 130203, the diameter of the lower ring 1304 is larger than the upper ring 1303, at least one return spring 1308 is arranged on each outer reflective plate 130202, one end of the return spring 1308 is fixed with the outer reflective plate 130202, the other end of the return spring 1308 is fixed with the lower ring 1304. Making the main steel wire rope 1306 wind around the capstan 1307 by operating the capstan 1307 can elongate the main steel wire rope 1306 and shorten the secondary steel wire rope 1305, which will directly make the inner reflective plates 130201 rotate to a higher position and then the outer reflective plate 130202 also rotates to a higher position. Finally, the space surrounded by the inner reflective plate 130201 and the outer reflective plate 130202 will become larger, and the area to be heated in the thermoplastic plates 15 will become larger. Besides, making the main steel wire rope 1306 be away from the capstan 1307 by operating the capstan 1307 can shorten the main steel wire rope 1306 and elongate the secondary steel wire rope 1305, the return spring 1308 will make the outer reflective plates 130202 rotate to a lower position and then the inner reflective plate 130201 also rotates to a lower position. Finally, the space surrounded by the inner reflective plate 130201 and the outer reflective plate 130202 will become smaller, and the area to be heated will become smaller. To achieve the above purpose, the return spring 1308 is in natural elongation or under compression as the outer reflective plates 130202 rotate to the lowest position.

The above heating system 12 can heat the upper and lower side of the area to be perforated in the thermoplastic plate 15. The areas to be perforated are changeable in the practical engineering. Hence, the area to be heated can be changed with the area to be perforated, and a distance adjustment member 14 is arranged to adjust the distance between the heating part 13 and the thermoplastic plate 15 in this embodiment, the distance adjustment member 14 can obtain a changeable area to be heated.

The distance adjustment member 14 includes two hexagonal frames 1401, each hexagonal frame 1401 is arranged on a corresponding sliding rail 10 of the two sliding rails 10 in the same way, respectively, and the plane of each hexagonal frame 1401 is perpendicular to the plane of two parallel sliding rails 10.

The schematic diagram of the hexagonal frame 1401 is a shape of hexagon, any two adjacent edges in the hexagonal frame 1401 are hinged together in the shared endpoint, the hexagonal frame 1401 includes two parallel edges 1402 respectively parallel to the two sliding rails 10, and four side edges 1403 formed between the two parallel edges 1402, the two parallel edges 1402 have the same length, and the four side edges 1403 have the same length, the lengths of the two parallel edges 1402 can be the same as or different from the lengths of the four side edges 1403, the above detailed structure can make the hexagonal frame 1401 be symmetrical. Two of four side edges 1403 are located in the left end of the two parallel edges 1402, and the other two of four side edges 1403 are located in the right end. The sliding hinged points 1404 between two adjacent side edges 1403 are all located in the sliding rail 10 and can move along the sliding rail 10, which can be achieved by arranging a single sliding chute along the length direction of the sliding rail 10. The sliding hinged points 1404 in the sliding rail 10 can be locked by the lock catch 1406, as the sliding hinged points 1404 are required to be static. The butterfly bolt can be used for achieving the lock catch 1406. It is worth noting that the butterfly bolt belongs to the existing technology, so its specific structure is not detailed. The hexagonal frame 1401 is also provided with two limit sliding rails 1407 perpendicular to both the sliding rail 10 and two parallel edges 1402, both the upper part and lower part of the limit sliding rail 1407 are provided with a limit sliding chute 1408, the hinged points 1405 between the parallel edge 1402 and the side edge 1403 are all located in the limit sliding chute 1408. According to the position of the hinged points 1405, the hinged points 1405 can be arranged in the upper and lower limit sliding chute 1408. As the position of any edge in the hexagonal frame 1401 changes, the position and shape of the whole hexagonal frame 1401 will change in this embodiment.

Because two same hexagonal frames 1401 are provided in this embodiment, in order to ensure the consistent motion of the two hexagonal frames 1401 subjected to external forces, a connecting rod 1409 is adopted to connect the hinged points 1405 of the same height in the two hexagonal frames 1401, and the connecting rod 1409 is perpendicular to the plane of hexagon in the two hexagonal frames 1401. Theoretically, only one connecting rod 1409 is enough to connect the two hexagonal frames 1401, but it is necessary to set more than one connecting rod 1409 to ensure the overall structure stability of the connection. In this embodiment, four connecting rods 1409 are provided. The hinged points 1405 corresponding to the two hexagonal frames 1401 are connected by four connecting rods 1409.

The reflective heat focusing hood 1302 above the sliding rail 10 is connected to the parallel edges 1402 at the upper part of the two hexagonal frames 1401, and the reflective heat focusing hood 1302 below the sliding rail 10 is connected to the parallel edges 1402 at the lower part of the two hexagonal frames 1401. As the sliding hinged point 1404 in one hexagonal frame 1401 moves along the sliding rails 10, the hinged point 1405 moves vertically along the limit sliding rail 1407, the two parallel edges 1402 in one hexagonal frames 1401 move up and down, which is the same motion as the two parallel edges 1402 in the other hexagonal frames 1401. Because of the connecting rod 1409, the motions of two hexagonal frames 1401 are identical to each other. In this embodiment, the hexagonal frame 1401 can make the two reflective heat focusing hoods 1302, above and below the sliding rails 10, both move towards the sliding rails 10 or away from the sliding rails 10, which will constantly make the area of the upper surface to be heated be equal to the area of the lower surface to be heated.

During the perforating process of the perforating device, the damper 4 is used to clamp the thermoplastic plate 15, the area to be perforated in the thermoplastic plate 15 is located below or above the opening in the splint 401 of the damper 4. Make the damper 4 slide along the sliding rail 10 until the area to be perforated reaches the heating area in the heating system 12. According to the size of the area to be perforated, the corresponding heating area of the two heating parts 13 can be obtained by adjusting the hexagonal frame 1401. The heating parts 13 begin to work after its switching on. As the temperature of the area to be perforated is suitable, make the damper 4 slide along the sliding rail 10 until the area to be perforated reaches below the electromagnetic chuck 1, the electromagnetic chuck 1 is powered on and the corresponding spike 3 is set in the mounting plate 2 in advance. The driving member begins to move down, and the area to be perforated will be pierced by the spike 3. After the piercing of the spike 3, the electromagnetic chuck 1 is powered off and the driving member begins to move up immediately, and the spike 3 remains in the area to be perforated. The thermoplastic plate 15 with the spike 3 can be transferred to another place for curing. Now, the perforating device can work for another thermoplastic plate 15 and repeat the above perforating process, namely, heating, making the electromagnetic chuck 1 powered on, piercing of the spike 3, making the electromagnetic chuck 1 powered off and making the spike 3 kept in the area to be pierced.

If the area to be perforated changes during the continuous perforating process, the distance between the heating part 13 and the thermoplastic plate 15 can be adjusted by adjusting the height of the hexagonal frame 1401, and the size of the heat focusing zone of the heating part 13 can be adjusted by the capstan 1307, which will change the heating area of the area to be perforated.

The foregoing description is merely a specific embodiment of the present disclosure, but the protection scope of the present disclosure is not limited thereto, any variation or replacement made by one of ordinary skill in the related art without departing from the scope of the present disclosure should falls with the protection scope of the present disclosure. Therefore, the protection scope of the present invention shall be subject to the protection scope of the claims.

What is claimed is:

1. A perforating device for thermoplastic plates comprising: an electromagnetic chuck, one side of the electromagnetic chuck connected with a driving member, the other side of the electromagnetic chuck connected with a mounting plate and a spike assembled with the mounting plate so that the mounting plate is arranged between the spike and the electromagnetic chuck, and the electromagnetic chuck secures the mounting plate on which the spike is located, a head of the spike arranged on the spike, and wherein the electromagnetic chuck provides an electromagnetic force so that the electromagnetic force secures the mounting plate on which the head of the spike is located, a clamper located below the mounting plate and configured to clamp a thermoplastic plate therein, and a heating system provided below the mounting plate to heat the thermoplastic plate; and wherein two sliding rails are arranged below the mounting plate, and the damper is arranged between the two sliding rails and configured to move along the two sliding rails; and wherein the heating system is arranged on the two sliding rails and comprises two heating parts arranged opposite to each other, each of the two heating parts comprising a heating wire and a reflective heat focusing hood, the reflective heat focusing hoods configured to reflect heat generated by the heating wires, one of the two heating parts arranged above the two sliding rails, the other of the two heating parts arranged below the two sliding rails.

2. The perforating device for thermoplastic plates according to claim 1, wherein one side of the mounting plate facing away from the electromagnetic chuck is provided with a groove, a shape and a size of the groove corresponding to a shape and a size of the head of the spike, so that when the head of the spike is arranged in the groove, the spike cannot rotate or move.

3. The perforating device for thermoplastic plates according to claim 1, wherein a horizontal circular ring is arranged at an upper part of the head of the spike, a lower surface of the horizontal circular ring is an annular plane, and an area of the horizontal circular ring is larger than an area to be perforated in the plate.

4. The perforating device for thermoplastic plates according to claim 1, wherein two splints are respectively arranged on upper and lower parts of the clamper.

5. The perforating device for thermoplastic plates according to claim 1, the damper comprises a handle.

6. The perforating device for thermoplastic plates according to claim 1, wherein each of the reflective heat focusing hoods comprises a top cover, a middle part of the top cover is a circular surface, and an upper ring is arranged below the circular surface and hinged with a plurality of inner reflective plates and outer reflective plates, the inner reflective plates and the outer reflective plates are alternately arranged around the upper ring, there is an overlap between the inner reflective plates and the adjacent outer reflective plates, and the inner reflective plates are arranged under the outer reflective plates; each of the inner reflective plates is fixed with a secondary steel wire rope on a bottom part thereof, all the secondary steel wire rope gather in the middle of the top cover and then form a main steel wire rope, the main steel wire rope is attached to a capstan, a lower ring is arranged below the upper ring, the lower ring and the upper ring keep static with respect to the top cover, the diameter of the lower ring is larger than the upper ring, at least one return spring is arranged on each of the outer reflective plate, one end of the return spring is fixed with the outer reflective plate, the other end of the return spring is fixed with the lower ring.

7. The perforating device for thermoplastic plates according to claim 1, wherein the heating system comprises a distance adjustment part comprising two hexagonal frames, each of the two hexagonal frames respectively arranged on the two sliding rails in the same way, each of the two hexagonal frames comprising two parallel edges respectively parallel to the two sliding rails, and four side edges formed between the two parallel edges, the two parallel edges having the same length, and the four side edges having the same length, all the two parallel edges and the four side edges of each of the two hexagonal frames hinged, and a sliding hinged point that is formed between two adjacent edges of the four side edges slidably arranged on a corresponding sliding rail of the two sliding rails, and a lock catch arranged on the corresponding sliding rail of the two sliding rails; and wherein each of the two hexagonal frames further comprises two limit sliding rails perpendicular to the two sliding rails, a limit sliding chute arranged on two opposite ends of each of the two limit sliding rails, each of the four side edges is hinged with one of the two adjacently parallel edges by a hinged point, all the hinged points between the two parallel edges and the four side edges are located in the limit sliding chute, the two hexagonal frames are connected by a connecting rod, the two ends of the connecting rod are fixed with two corresponding hinged points respectively in the same position of the two hexagonal frames, and the connecting rod is perpendicular to the plane of hexagon in the two hexagonal frames, one of the two heating parts is fixed on the upper parallel edges arranged on the two hexagonal frames, the other of the two heating parts is fixed on the lower parallel edges arranged on the two hexagonal frames.

8. The perforating device for thermoplastic plates according to claim 1, wherein the driving member comprises an air supply connector, one side of the air supply connector connected with a cylinder, a piston received in the cylinder and connected with one end of a piston rod, the other end of the piston rod is connected with the electromagnetic chuck.

* * * * *